March 29, 1927.

J. KOVATS

GRAPEFRUIT CORER

Filed Aug. 18, 1926

1,622,874

Inventor
John Kovats
By Wooster & Davis
Attorneys

Patented Mar. 29, 1927.

1,622,874

UNITED STATES PATENT OFFICE.

JOHN KOVATS, OF BRIDGEPORT, CONNECTICUT, ASSIGNOR TO LORRAINE METAL MANUFACTURING COMPANY, OF BRIDGEPORT, CONNECTICUT, A CORPORATION OF NEW YORK.

GRAPEFRUIT CORER.

Application filed August 18, 1926. Serial No. 129,987.

This invention relates to a corer for fruits, and which is especially adapted for coring grapefruit, and has for an object to provide a device of this character which is extremely simple in construction and may be manufactured at low cost, and which may be easily and quickly manipulated to remove the core from the grapefruit.

It is also an object of the invention to provide a corer of this type in which the core removing means also provides a strainer through which the juices of the core may be pressed after the core has been removed from the fruit.

With these and other objects in view, I have devised a corer the preferred form of which is illustrated in the accompanying drawing forming a part of this specification. In this drawing—

Figure 4:
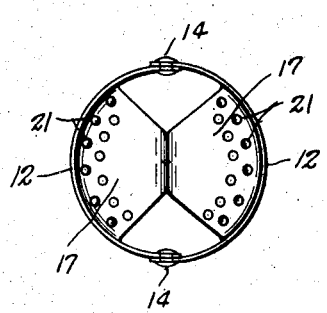
Fig. 4 is a bottom plan view.

The corer is extremely simple in construction comprising two similar members 10 and 11 which in general configuration are substantially T-shape with the cross portion 12 curved transversely so that it is concavo convex. It is preferably made substantially semi-cylindrical but not necessarily so. The longitudinal portion 13 forms a handle and is preferably made substantially U-shape in cross section as this gives a very strong and rigid construction. The curved portions 12 are pivoted together at 14 adjacent their opposite free ends so as to provide a substantially cylindrical body portion and these curved portions 12 have a cutting edge 15 which is preferably curved both longitudinally of the side walls 12, as indicated in Fig. 2, and transversely thereof, as indicated in Fig. 4; and therefore, when they are fully separated they are inclined, as viewed in Fig. 1, with the central portions 16 of the cutting edges lower than the portions adjacent the pivots. The walls are inclined inwardly from the upper part of the side walls 12, as indicated at 17, to form stop walls on the opposite sides of the pivots from the cutting edges which will engage the core when the device is inserted in the fruit to limit this inward movement, and therefore, the device cannot be forced too far into the fruit.

Figure 1:
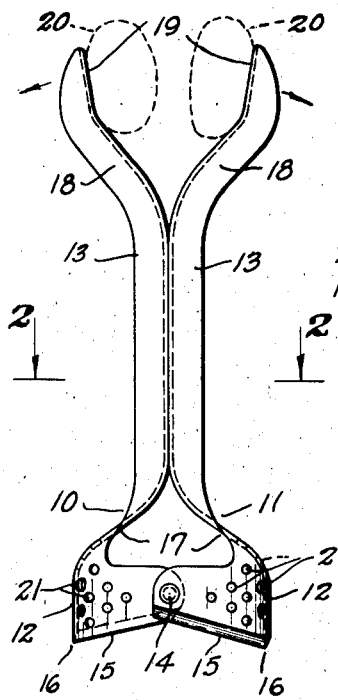
Fig. 1 is a side elevation of my improved corer in the open position, or that is, in position for insertion in the fruit to remove the core.
Figure 2:
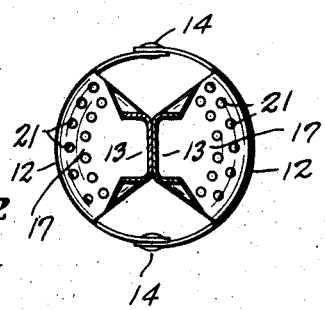
Fig. 2 is a transverse section thereof substantially on line 2—2 of Fig. 1.
Figure 3:
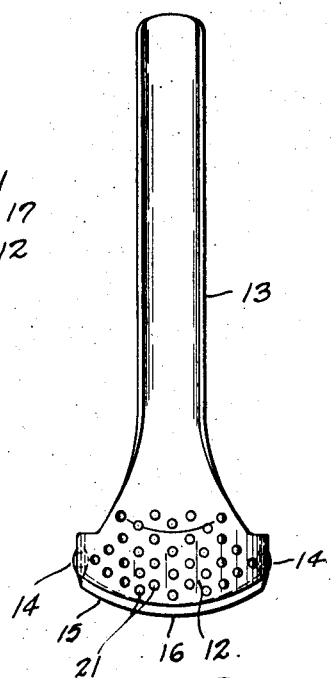
Fig. 3 is a side elevation looking from the right of Fig. 1.

The handles are so shaped that when the cutting edges are fully separated, as indicated in Fig. 1, they will contact intermediate their ends limiting this movement. At their free ends, however, they are separated and inclined outwardly, as indicated at 18, and are then extended longitudinally, as indicated at 19, to form spaced thumb pieces which may be grasped by the operator to swing the member about the pivots 14. To illustrate this operation I have shown in dotted lines 20 the position of the thumbs. The curved side walls 12 are also preferably provided with openings or perforations 21 to form a strainer through which the juices of the core may be pressed after it is removed from the fruit.

Figure 5:
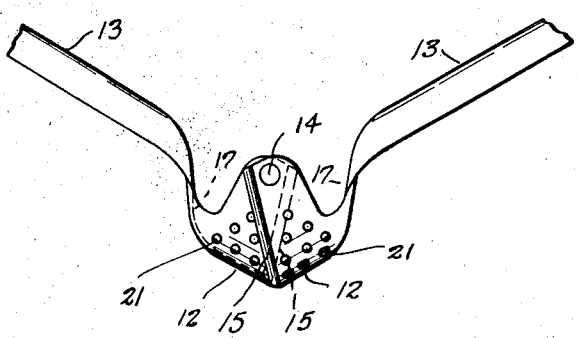
Fig. 5 is a side elevation showing the corer closed, or that is, with the cutting edges moved together to cut the core from the fruit.

In operation the device is normally in the position of Fig. 1 with the handles together. These handles are then grasped by the operator and the curved portions 12 are placed with the cutting edges about the core, and then by forcing downwardly on the handle and turning the device back and forth about its vertical or longitudinal axis the inclined cutting edges 15 will cut through the radial division walls running from the core. This cutting action is improved and facilitated by the inclined arrangement of the cutting edges as indicated in Fig. 1. The movement of the device into the fruit will be limited by engagement of the stop walls 17 with the top of the core. The operator then grasps the thumb pieces 19 of the handle by placing his thumbs on the inner walls thereof, as indicated, and swinging these free ends of the handle downwardly and outwardly, as indicated by the arrows, to the position shown in Fig. 5. This completely severs the core from the fruit by swinging the cutting edges together, and the core is held in the hollow formed by the curved side walls 12 of the device and it may thus, of course, be lifted from the fruit. The juices of the core, however, may be saved by pressing on the top of the core with a spoon or other similar article which will press these juices through the openings 21 and allow them to run back into the fruit.

It will be obvious that the device may be easily and quickly operated and that it is extremely simple in construction. The two members forming the handles and cutting portions are each stamped in one piece from sheet metal and then bent to shape, while the assembling operation merely involves the placing of the pivotal rivets 14.

Having thus set forth the nature of my invention what I claim is:

1. A grapefruit corer comprising a pair of similar members which in general configuration are substantially T-shape with the cross portion curved to form a concavo-convex portion provided with a cutting edge and the longitudinal portion forming a handle, and pivotal means connecting the free ends of said curved portions of the members about which the cutting edges may be swung toward and from each other.

2. A grapefruit corer comprising a pair of similar members which in general configuration are substantially T-shape with the cross portion curved to form a concavo-convex portion provided with a cutting edge and the longitudinal portion forming a handle, pivot means connecting the free ends of said curved portions of the members, and the walls connecting said curved portions with the handles being extended inwardly toward each other on the opposite side of the pivots from the cutting edges to form stops to engage the core and limit the insertion of the corer into the fruit.

3. A grapefruit corer comprising a pair of similar members which in general configuration are substantially T-shape with the cross portion curved to form a concavo-convex portion provided with a cutting edge and the longitudinal portion forming a handle, and pivotal means connecting the free ends of said curved portions of the members about which the cutting edges may be swung toward and from each other, said curved walls being provided with openings so that when the cutting edges are together these walls form a strainer through which the juices of the core may be pressed.

4. A grapefruit corer comprising a pair of similar members which in general configuration are substantially T-shape with the cross portion curved to form a concavo-convex portion provided with a cutting edge and the longitudinal portion forming a handle, pivot means connecting the free ends of said curved portions of the members about which the cutting edges may be swung toward and from each other, said handles when the cutting edges are fully separated being in engagement intermediate their ends and inclined outwardly and separated at their free ends to form thumb pieces to be gripped by the operator to separate the handles after the corer has been inserted in the fruit to swing the cutting edges together.

5. A grapefruit corer comprising a pair of similar members which in general configuration are substantially T-shape with the cross portion curved to form a concavo-convex portion provided with a cutting edge and the longitudinal portion forming a handle, pivot means connecting the free ends of said curved portions of the members about which the cutting edges may be swung toward and from each other, said handles being substantially U-shape in cross section and arranged with their closed sides in engagement when the cutting edges are fully separated, the free end portions of said handles being inclined outwardly away from each other and then extending longitudinally to provide spaced thumb pieces to be grasped by the operator to manipulate the handles.

6. A grapefruit corer comprising two similar members having substantially semi-cylindrical side walls each having a cutting edge curved both longitudinally and transversely of said side walls, pivots connecting said side walls adjacent their free ends to form a substantially cylindrical member when the cutting edges are fully separated and about which the cutting edges may be swung toward and from each other, and handles for swinging the members about the pivots.

7. A grapefruit corer comprising two similar members having substantially semi-cylindrical side walls each having a cutting edge curved both longitudinally and transversely of said side walls, pivots connecting said side walls adjacent their free ends to form a substantially cylindrical member when the cutting edges are fully separated and about which the cutting edges may be swung toward and from each other, said side walls being provided with openings so that when the cutting edges are together these walls form a strainer through which the juices of the core may be pressed, and handles for swinging the members about the pivots.

8. A grapefruit corer comprising two similar members having substantially semi-cylindrical side walls each having a cutting edge curved both longitudinally and transversely of said side walls, pivots connecting said side walls adjacent their free ends to form a substantially cylindrical member when the cutting edges are fully separated and about which the cutting edges may be swung toward and from each other, said members including walls inclined inward from said side walls on the opposite side of the pivots from the cutting edges to form a stop to engage the core and limit the insertion of the corer into the fruit, and handles for swinging the members about the pivots.

9. A grapefruit corer comprising two similar members having concavo-convex side walls each having a cutting edge, pivots connecting said side walls adjacent their free ends to form a substantially tubular member when the cutting edges are fully separated and about which the cutting edges may be swung toward and from each other, said side walls being provided with openings so that when the cutting edges are together these walls form a strainer through which the juices of the core may be pressed, and handles for swinging the members about the pivots.

10. A grapefruit corer comprising two similar members having concavo-convex side walls each having a cutting edge, pivots connecting said side walls adjacent their free ends to form a substantially tubular member when the cutting edges are fully separated and about which the cutting edges may be swung toward and from each other, said members including walls inclined inward from said side walls on the opposite side of the pivots from the cutting edges to form a stop to engage the core and limit the insertion of the corer into the fruit, and handles for swinging the members about the pivots.

In testimony whereof I affix my signature.

JOHN KOVATS.